US008958142B1

(12) United States Patent
Peratt

(10) Patent No.: US 8,958,142 B1
(45) Date of Patent: Feb. 17, 2015

(54) PULSED-POWER SPIRAL/CONICAL ELECTROMAGNETIC RADIATION AMPLIFIER

(71) Applicant: Anthony L. Peratt, Los Alamos, NM (US)

(72) Inventor: Anthony L. Peratt, Los Alamos, NM (US)

( * ) Notice: Subject to any disclaimer, the term of this patent is extended or adjusted under 35 U.S.C. 154(b) by 121 days.

(21) Appl. No.: 13/800,968

(22) Filed: Mar. 13, 2013

Related U.S. Application Data

(60) Provisional application No. 61/610,079, filed on Mar. 13, 2012.

(51) Int. Cl.
*H01S 3/00* (2006.01)

(52) U.S. Cl.
USPC ....... 359/333; 315/111.41; 307/106; 327/181

(58) Field of Classification Search
USPC .......... 359/333; 372/2; 315/111.41; 307/106; 327/181
See application file for complete search history.

(56) References Cited

U.S. PATENT DOCUMENTS

| | | | | | |
|---|---|---|---|---|---|
| 4,755,764 | A * | 7/1988 | Rosenberg et al. | ........... | 359/335 |
| 5,003,225 | A * | 3/1991 | Dandl | ...................... | 315/111.41 |
| 6,518,706 | B1 * | 2/2003 | Yugami et al. | ........... | 315/111.81 |
| 2007/0085618 | A1 * | 4/2007 | Ganghofer et al. | ........... | 331/169 |
| 2014/0152227 | A1 * | 6/2014 | Tuval et al. | ................... | 318/503 |

* cited by examiner

*Primary Examiner* — Mark Hellner
(74) *Attorney, Agent, or Firm* — Jeffrey D. Myers; Philip D. Askenazy; Peacock Myers, P.C.

(57) ABSTRACT

An electromagnetic radiation amplifier (and concomitant amplification method) comprising a pulsed power source, a spherical or half-spherical cathode proximate the power source, an anode focusing assembly comprising a plurality of converger/spreader spheres, and a plurality of current conductors connecting the cathode and the anode focusing assembly.

20 Claims, 4 Drawing Sheets

PULSED-POWER SPIRAL/CONICAL ELECTROMAGNETIC RADIATION AMPLIFIER

CROSS-REFERENCE TO RELATED APPLICATIONS

This application claims priority to and the benefit of the filing of U.S. Provisional patent application Ser. No. 61/610,079, entitled "Pulsed-Power Spiral/Conical Electromagnetic Radiation Amplifier", filed on Mar. 13, 2012, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention relates to electromagnetic pulse generators.

Description of Related Art

Technology developed during the Strategic Defense Initiative can now be applied to interdisciplinary fields in science and technology where the propagation of an intense electromagnetic pulse is desired. The present invention is of a four-stage spiral/conical electromagnetic wave amplifier, the 'load' being at the end of a magnetic-insulated transmission line.

The present invention relates to a new type of pulsed energy antenna specifically designed to produce an intense, directed beam of radiation, when driven by a high-energy-density source such as a large pulse power transmission line or an explosively generated magnetic field compression generator. Another application is the study of solar plasma flows of varying energies and sizes such as the nature and instabilities of coronal mass ejections whose energies may exceed megajoules to terajoules of energy.

The rapid development of high-voltage pulsed power technology during the last fifty years has made it possible to investigate intense currents, high voltages, and energetic particles found in earth laboratories and in space applications. Megaamperes of current in pulsed beams of electrons and ions with particle kinetic energies in the range from KeV to GeV have been achieved. Although this technology was originally developed for materials testing, radiography, and nuclear weapon effects simulation, it has found widespread use in fields as diverse as thermonuclear fusion, high-power microwave generation, collective ion acceleration, synchrotron radiation, laser excitation, and laboratory astrophysics.

A multi-terawatt pulsed-power generator may consist of an array of capacitor banks (called a "Marx bank"), or many kilograms of high explosive on a magnetic field compression generator. The generator transfers its energy to the antenna or 'load' by means of a coaxial pulse-line. Terminating the pulse line is a cathode and an anode between which is strung conducting wires (the 'antenna') that explode into an array of plasma filaments, each called a z-pinch.

The purpose of the pulse-line is to shorten the microseconds-long-pulse generated by the Marx bank, which may contain megajoules of energy, to a 30-60 nanosecond long-pulse at the diode, thereby producing a power amplification (watts=joules per second). In this way, space and astrophysical magnitude quantities are generated: megaamperes of current, megavolts of potential differences, terawatts of power and mega-electron-volt particle energies with concomitant bursts of visible synchrotron radiation. Synchrotron radiation is the sharpest and most intense form of light known, with applications from etching semiconductor circuit boards to understanding solar and astrophysical radiation.

All of the high-energy density, high-voltage experiments through the 1990's employed Kel-F, a white-soap-like thermoplastic. After 1995, its predecessor Neoflon (also a thermoplastic fluoropolymer) was used. The attributes of this polymer are easy machinability, low moisture absorption, and excellent electrical properties over a temperature range −240° C. to +204° C. The extremely low out-gassing of this material makes it suitable for maintaining high-vacuum within the diode chamber.

The experimental diagnostics for a pulse-power generator and its load include current and voltage probes, B-dot probes, x-ray diodes, pin hole x-ray cameras, scintillators, streak cameras, spectrum analyzers, double pulse holography lasers, and antenna arrays located around and at various frequencies and distances from the source antenna.

Using the Los Alamos PHERMEX facility, laboratory z-pinches have been studied as sources of microwave and synchrotron radiation. The largest experiments fielded at Ancho Canyon and the Nevada Test Site included 1-m diameter cathodes and 15-m long, 30-cm wide, explosively driven pulse-lines.

Magnetic flux compression experiments were first performed in early 1944 ,as part of the Los Alamos atomic bomb project. A considerable enhancement in electrical energy (>200 MJ) to the antenna is possible by including in the capacitor circuit a helical coil within which a rod of high explosive is placed. This is ignited at the far end thereby rapidly compressing the coil with a large increase in the circuit current.

Over the course of some 7,000 shots (wire-array discharges) with various pulse power generators, as well as the investigation of some thousands of patterns recorded from (Birkeland) current conducting space plasmas, a universal load with specific, scaled dimensions, number of conducting currents, and elements as validated by numerical simulation of z-pinches on supercomputers, has been discovered.

Once exploded, thin wires vaporize to plasma filaments (in the astrophysical case, plasma filaments preexist) that behave in accordance with Ampere's force laws. Currents in the same direction are attractive bringing them to pinch together until radial forces cause them to spin around each other in repulsion, then defocus. As a result, particle-in-cell computations are necessary to determine where the pinch is, and how to locate it close to the anode for small-angle forward radiation directivity. This is achieved by placing conductors and dielectrics axially along the pinch axis as described below.

BRIEF SUMMARY OF THE INVENTION

The present invention is of an electromagnetic radiation amplifier (and concomitant amplification method) comprising: a pulsed power source; a spherical or half-spherical cathode proximate the power source; an anode focusing assembly comprising a plurality of converger/spreader spheres; and a plurality of current conductors connecting the cathode and the anode focusing assembly. In the preferred embodiment, the cathode comprises brass or anodized aluminum or steel, the converger/spreader spheres comprise beryllium, the current conductors comprise titanium or plasma, and the current conductors number at least 56. There is preferably a thermoplastic fluoropolymer sphere located between two converger/spreader spheres, most preferably wherein the Kel-F sphere has a thin diffuse layer of palladium. The pulsed power source can be a magnetic field compression generator comprising a capacitor bank and an explosive energy source.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
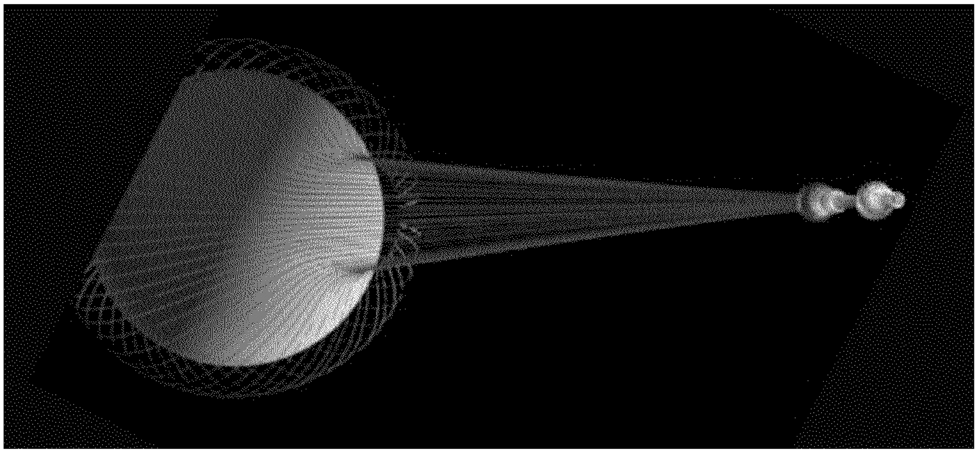
FIG. 1 is a perspective view of a 4-stage spiral/conical electromagnetic radiation amplifer and visualizing template, with the cathode to the left and the focusing anode to the right—strung between the elements are preferably 112 or 56 filament conductors.
Figure 2:
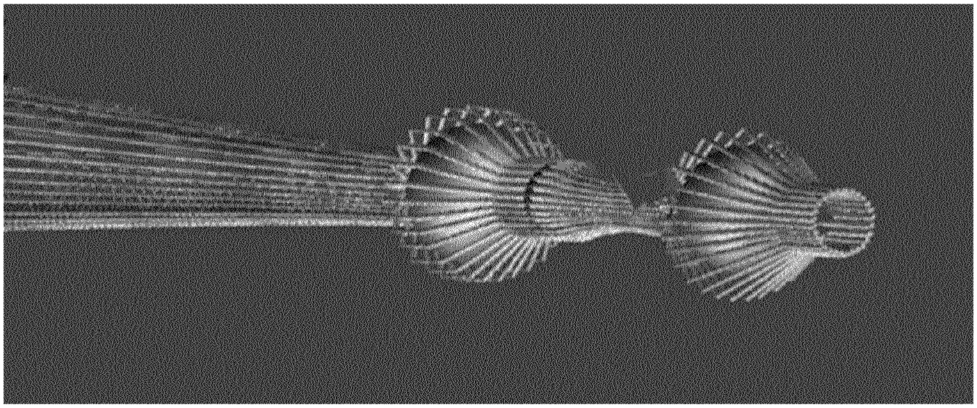
FIG. 2 is a perspective view of the radiation amplifier anode assembly—a B-dot probe is shown between the last two elements.

As shown in FIGS. 1 and 2, the invention is a four-stage spiral-conical 'antenna' preferably comprising a spherical or half-spherical, anodized steel, or brass, cathode emitter. Following is a focusing assembly preferably comprising a spherical beryllium converger/spreader, a resistive coated Kel-F spherical spacer, preferably followed by the anode and another spherical beryllium converger/spreader.

Preferably, 56 titanium wires or rods form a symmetrical enclosure of the cathode-anode assembly. The 56 currents, or more precisely, 56 pairs of currents, were derived from 100-kA to multi-megampere dense plasma focus experiments.

In all cases and independent of overall size, the pulsed energy antenna preferably comprises four elements designed to optimally converge and transfer the voltage/current pulse from the generator pulse-line to the spiral/conical electromagnetic radiation amplifier.

The relative dimensions of the radiation amplifier are preferably exact but the entire assembly may be scaled over an extreme range of sizes in accordance with the dimensions given below. The device comprise the following Elements: Cathode 1 comprising a sphere or half-sphere and being hollow, is preferably anodized aluminum or steel, or brass. Converger/spreaders 2,4 comprise hollow spheres and are preferably beryllium. Kel-F (Neoflon) 3 comprises a hollow sphere, and is preferably Kel-F (Neoflon) with a thin diffuse layer of palladium. Current conductors 5 preferably number 56 or 112, and are preferably wires (e.g., 15 microns in thickness), rods, or space currents, preferably comprising titanium or plasma.

All spheres are preferably hollow in the event at an internal electromagnet is needed to make them true 'terrella' with a dipolar magnetic field aligned along the axis for beam shaping. The use of a palladium coating is preferred to draw the electron beam in evenly around the dielectric Kel-F in the experimental setup.

Figure 3A:
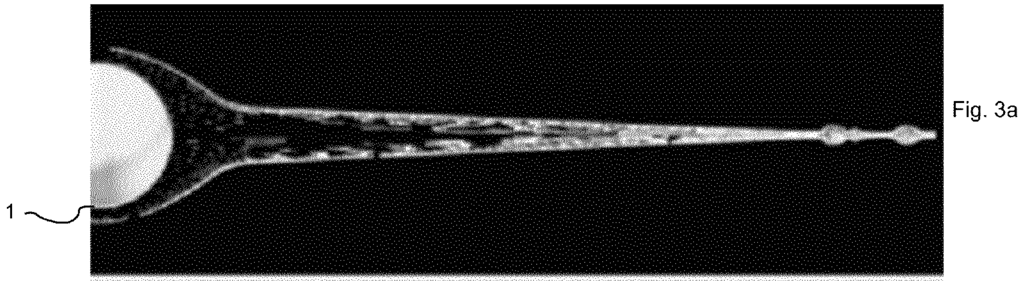
FIGS. 3(*a*) and 3(*b*) show preferred dimensions of the radiation amplifier determined over an extreme range of scales of usage and also of the focusing assembly.
Figure 3B:
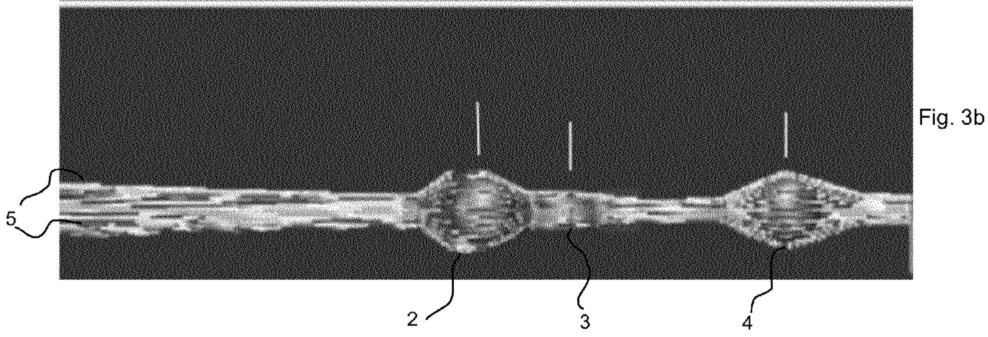
Figure 4A:
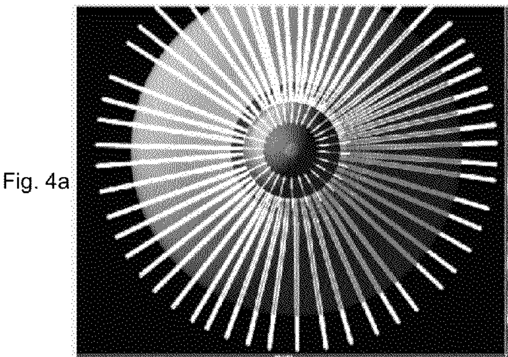
FIGS. 4(*a*)-4(d) show (a) a view from the anode into the antenna assembly, (b) a view from a camera on the last anode in the focusing assembly, with the load filaments coming up to the spherical beryllium converger/spreader, then continuing around the sphere, exiting opposite of the camera direction; (c) left side view of the focusing assembly; and (d) front view of the focusing assembly.
Figure 4B:
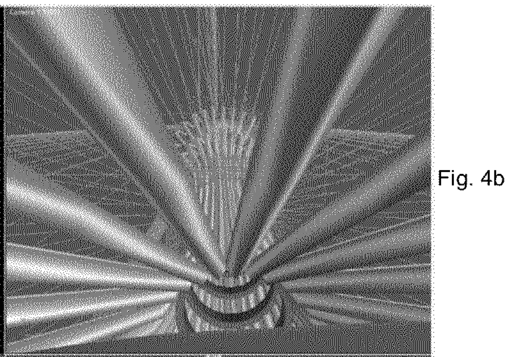
Figure 4C:
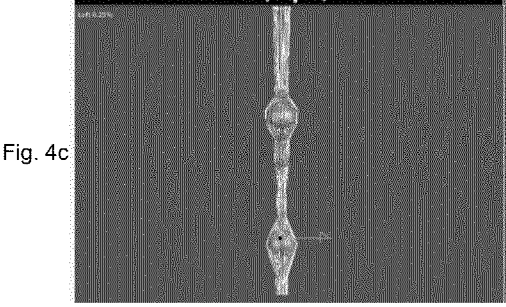
Figure 4D:
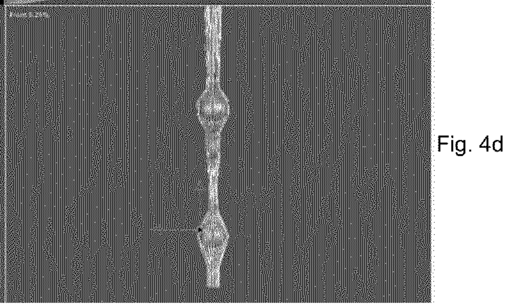

Preferred diameters and spacings of the noted components of the invention (see FIGS. 3*a* and 3*b*) are:

| | Diameter λ | Distance λ |
|---|---|---|
| Element 1 | 18.5 | |
| Element 2 | 2.05 | |
| Element 3 | 1.1 | |
| Element 4 | 2.15 | |
| Element 1-2 | | 94.8 |
| Element 1-3 | | 97.2 |
| Element 1-4 | | 106.5 |

λ is a scale factor of order 0.1 to fit the dimensions of the radiation amplifier to the dimensions of laboratory experiments, or of the order of astronomical dimensions for the case of coronal plasma mass ejections from the Sun, or larger.

Charged particle beams held together or pinched by their self-magnetic fields have been of general interest since their earliest investigation. Confinement in the simple cylindrical pinch is a result of the axial, or z, directed current I, hence, the name "Z" or "zed' pinch. The macroscopic picture of such a beam is that of a self-consistent magnetic confinement or compression against the expansion due to thermal pressure. Since they imply particle acceleration, there is electromagnetic radiation associated with them. The radiation from the relativistic electrons is synchrotron radiation with current densities of the order $10^{11}$ A/cm$^2$. These are similar to that of impulsive solar synchrotron bursts from electrons accelerated in solar flares.

For high-energy pulsed power, the electron beam is primarily along the surface of the wire or within the plasma conduction currents. Because of this, the synchrotron radiation follows closely the conducting plasma, that is, the shape of the conducting cage of the radiation amplifier antenna.

FIGS. 4(*a*) and 4(*b*) are an observer's view of the beam resulting from the invention by 'looking' into the radiation amplifier anode. Interestingly, records of similar patterns as seen and reproduced by mankind are found on all continents of the Earth. Observing the template (antenna) from the anode, it may be turned slightly to match records (stone carvings, ancient constructions) locally on Earth.

Figure 5:
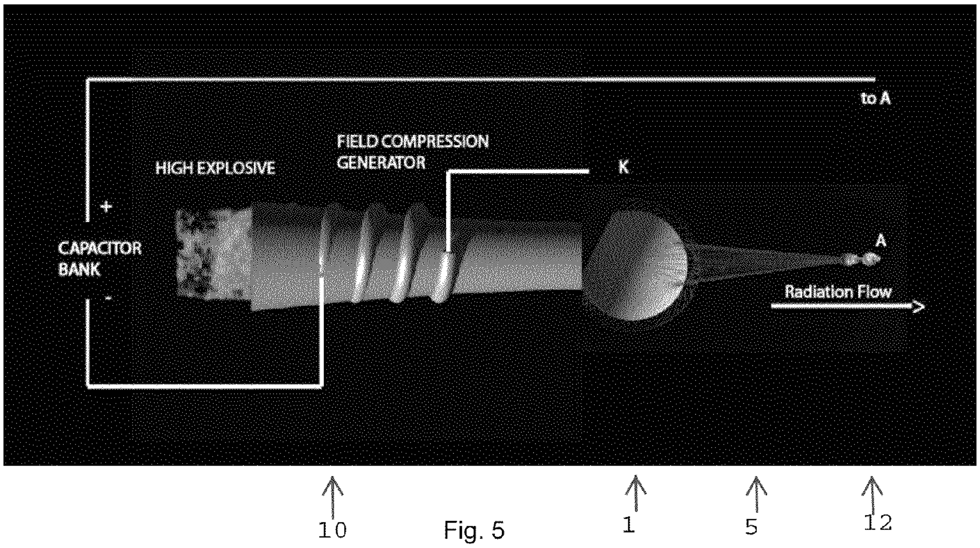
FIG. 5 is a schematic view of the magnetic field compression generator driven spiral/conical electromagnetic radiation amplifier of the invention.

The spherical/conical pulsed power antenna of the invention, comprising cathode 1, conductors 5, and anode assembly 12, has been designed to fit onto a magnetic field-compression generator as shown in FIG. 5, comprising a capacitor bank and an explosive energy source 10.

Note that in the specification and claims, “about” or “approximately” means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

what is claimed is:

1. An electromagnetic radiation amplifier comprising:

a pulsed power source;

a spherical or half-spherical cathode proximate said power source;

an anode focusing assembly comprising a plurality of converger/spreader spheres; and a plurality of current conductors connecting said cathode and said anode focusing assembly.

2. The amplifier of claim 1 wherein said cathode comprises brass or anodized aluminum or steel.

3. The amplifier of claim 1 wherein said converger/spreader spheres comprise beryllium.

4. The amplifier of claim 1 wherein said current conductors comprise titanium or plasma.

5. The amplifier of claim 1 wherein said current conductors number at least 56.

6. The amplifier of claim 1 additionally comprising a thermoplastic fluoropolymer sphere located between two converger/spreader spheres.

7. The amplifier of claim 6 wherein said thermoplastic fluoropolymer sphere has a thin diffuse layer of palladium.

8. The amplifier of claim 1 wherein said pulsed power source comprises a magnetic field compression generator.

9. The amplifier of claim 8 wherein said generator comprises a capacitor bank.

10. The amplifier of claim 9 wherein said generator comprises an explosive energy source.

11. An electromagnetic radiation amplifying method comprising:

providing a pulsed power source;

placing a spherical or half-spherical cathode proximate the power source;

providing an anode focusing assembly comprising a plurality of converger/spreader spheres; and connecting a plurality of current conductors from the cathode to the anode focusing assembly.

12. The method of claim 11 wherein the cathode comprises brass or anodized aluminum or steel.

13. The method of claim 11 wherein the converger/spreader spheres comprise beryllium.

14. The method of claim 11 wherein the current conductors comprise titanium or plasma.

15. The method of claim 11 wherein the current conductors number at least 56.

16. The method of claim 11 additionally comprising placing a thermoplastic fluoropolymer sphere between two converger/spreader spheres.

17. The method of claim 16 wherein the thermoplastic fluoropolymer sphere has a thin diffuse layer of palladium.

18. The method of claim 11 wherein the pulsed power source comprises a magnetic field compression generator.

19. The method of claim 18 wherein the generator comprises a capacitor bank.

20. The method of claim 19 wherein the generator comprises an explosive energy source.

* * * * *